United States Patent
Chen et al.

(10) Patent No.: US 11,865,652 B2
(45) Date of Patent: Jan. 9, 2024

(54) STEPPED PIN LOADING MECHANISM

(71) Applicant: HENGDIAN GROUP INNUOVO ELECTRIC CO., LTD., Dongyang (CN)

(72) Inventors: Yongfei Chen, Dongyang (CN); Hui Wang, Dongyang (CN); Jianhua Ji, Dongyang (CN); Xudong Shu, Dongyang (CN); Hao Qian, Dongyang (CN)

(73) Assignee: HENGDIAN GROUP INNUOVO ELECTRIC CO., LTD., Dongyang (CN)

( * ) Notice: Subject to any disclaimer, the term of this patent is extended or adjusted under 35 U.S.C. 154(b) by 329 days.

(21) Appl. No.: 17/433,986

(22) PCT Filed: May 8, 2020

(86) PCT No.: PCT/CN2020/089093
§ 371 (c)(1),
(2) Date: Aug. 25, 2021

(87) PCT Pub. No.: WO2021/036332
PCT Pub. Date: Mar. 4, 2021

(65) Prior Publication Data
US 2022/0143765 A1 May 12, 2022

(30) Foreign Application Priority Data
Sep. 1, 2019 (CN) .......................... 201910820462.0

(51) Int. Cl.
*B23P 19/00* (2006.01)
*B65G 29/00* (2006.01)
(Continued)

(52) U.S. Cl.
CPC ............ *B23P 19/002* (2013.01); *B65G 29/00* (2013.01); *B65G 47/1421* (2013.01); *B65G 47/1428* (2013.01); *B65G 47/24* (2013.01)

(58) Field of Classification Search
CPC .... B65G 29/00; B65G 47/24; B65G 47/1428; B65G 47/1421; B23P 19/002
See application file for complete search history.

(56) References Cited

U.S. PATENT DOCUMENTS

| 3,578,142 A | * | 5/1971 | Burgess, Jr. | ....... B65G 47/1421 |
|  |  |  |  | 198/389 |
| 4,245,733 A | * | 1/1981 | Kubota | .............. B65G 47/1421 |
|  |  |  |  | 198/396 |

(Continued)

FOREIGN PATENT DOCUMENTS

| CN | 107775358 | 3/2018 |
| CN | 109227123 | 1/2019 |

(Continued)

*Primary Examiner* — Nathaniel C Chukwurah
(74) *Attorney, Agent, or Firm* — Jiwen Chen; Joywin IP Law PLLC

(57) ABSTRACT

An object of the present invention is to provide a stepped pin loading mechanism which can be used for loading stepped pins, comprising a vibrator bowl. A spirally rising discharge track is connected to an outer side of a hopper of the vibrator bowl, and a swivel plate is provided on the discharge track, and several receiving slots are provided on the swivel plate. The strip-shaped receiving slot consists of an inner segment and an outer segment, and the width of the outer segment is greater than that of the inner segment. A front baffle and a rear baffle, both of which are provided with a through opening, are provided on the discharge track, an arc-shaped side baffle, which is located between the front baffle and the rear baffle to form a semi-enclosed structure, is provided on an outer circumferential side of the swivel plate. One end of the side baffle deviates from the through opening of the rear (Continued)

baffle, and the height of an upper edge of the side baffle gradually increases from the rear baffle to the front baffle so that an upper edge at the other end of the side baffle is as high as an upper side of the through opening of the front baffle.

9 Claims, 2 Drawing Sheets

(51) Int. Cl.
  *B65G 47/14* (2006.01)
  *B65G 47/24* (2006.01)

(56) References Cited

U.S. PATENT DOCUMENTS 4,453,626 A * 6/1984 Roberts .............. B65G 47/1421
                                              198/392
5,853,078 A * 12/1998 Kneubuhler ....... B65G 47/1421
                                              198/395

FOREIGN PATENT DOCUMENTS

| CN | 208496223 U | 2/2019 |
| DE | 102018103676 | 8/2019 |

\* cited by examiner

STEPPED PIN LOADING MECHANISM

This is a U.S. national stage application of PCT Application No. PCT/CN2020/089093 under 35 U.S.C. 371, filed May 8, 2020 in Chinese, claiming priority of Chinese Application No. 201910820462.0, filed Sep. 1, 2019, all of which is hereby incorporated by reference.

TECHNICAL FIELD OF THE INVENTION

The present invention relates to a stepped pin loading mechanism.

BACKGROUND OF THE INVENTION

In order to improve the production efficiency and reduce the labor cost, most of existing planet carrier components are press-fitted by automation equipment. For example, the Chinese Patent Application No. 201910508182.6 discloses a method for loading pin shaft parts, which loads wheel shafts through a vibrator bowl and a tubular track, so that the wheel shafts are conveyed in a vertical arrangement to a planet carrier. However, this solution can only be used for loading wheel shafts of the same diameter, but not for loading stepped pins.

In order to facilitate the press-fitting of the planet carrier and the stepped pins, all stepped pins are required to be conveyed in the manner that thin segments at the front direction and the thick segments at the back direction or in the manner that the thick segments at the front direction and the thin segments at the back direction, at least in the later stage of the loading process, so that the stepped pins conveyed onto the planet carrier are all arranged in such a way that the thin segments or thick segments thereof are arranged in the manner that with thin segments at the front direction and the thick segments at the back direction or in the manner that the thick segments at the front direction and the thin segments at the back direction.

SUMMARY OF THE INVENTION

An object of the present invention is to provide a stepped pin loading mechanism which can be used for loading stepped pins.

In order to achieve the above purpose, the present invention adopts the following technical scheme: the stepped pin loading mechanism is provided, including a vibrator bowl or disk, wherein a spirally rising discharge track is connected to an outer side surface of a hopper of the vibrator bowl, and a swivel plate, which is linked with a drive motor and revolves on the swivel plate's own axis under the action of the drive motor, is provided on the discharge track, and several receiving slots running vertically through an outer circumferential wall of the swivel plate are provided on the swivel plate. The strip-shaped receiving slot consists of an inner segment and an outer segment, and the width of the outer segment is greater than that of the inner segment. A front baffle and a rear baffle, both of which are provided with a through opening running through the baffle in a longitudinal direction for stepped pins to pass through, are provided on the discharge track. An arc-shaped side baffle, which is located between the front baffle and the rear baffle to form a semi-enclosed structure, is provided on an outer circumferential side of the swivel plate, and the semi-enclosed structure is formed with an opening facing toward the hopper to communicate with the hopper. One end of the side baffle deviates from the through opening of the rear baffle, and the height of an upper edge of the side baffle gradually increases from the rear baffle to the front baffle so that an upper edge at the other end of the side baffle is as high as an upper side of the through opening of the front baffle.

In use or operation of the mechanism of the present invention, the vibrator bowl and the drive motor will be started up after all the stepped pins are put into the hopper of the vibrator bowl. When conveyed to the discharge track, each stepped pin will get into each receiving slot of the drive motor after passing through the through opening of the rear baffle plate (heading in the direction of forward motion of the stepped pins) under the action of the vibrator bowl. For the stepped pins with the thin segments ahead, the entire body of the stepped pins will get into the receiving slot of the swivel plate. However, for those stepped pins with the thick segments ahead, only the thick segment will get into the receiving slot. With the rotation of the swivel plate, the thin segment of the stepped pin that does not get fully into the receiving slot will be plugged into one end of the side baffle close to the rear baffle. With the continuous rotation of the swivel plate, the thin segment of the stepped pin will move upward along an upper end face of the side baffle. With the continuous rotation of the swivel plate, the stepped pin that gets into the receiving slot with its thin segment ahead will continue to move forward after passing through the through opening of the front baffle and keep moving with its thick segment ahead, while the stepped pin that gets into the receiving slot with its thick segment ahead will fall back into the hopper of the vibrator bowl from the discharge track. The loading mechanism of the present invention can realize the selection and loading of the stepped pins, so that all stepped pins to be loaded will be loaded with thick segments ahead, to facilitate the subsequent conveying and press-fitting of the stepped pins. In order to ensure that the stepped pin with its thick segment ahead can rotate together with the swivel plate, the distance between a rear end of the side baffle and a front end face of the rear baffle must be greater than the length of the thin segment.

Preferably, the thickness of the swivel plate is less than the maximum diameter of the stepped pin. In this way, it is easier to lift the thin segment of the stepped pin that gets into the swivel plate with its thick segment ahead.

Preferably, the thickness of the swivel plate is greater than the maximum radius of the stepped pin. In this way, the step pin that gets fully into the receiving slot of the swivel plate can be avoided from moving upward to a position above the swivel plate under the vibration of the vibrator bowl.

Preferably, a spacing or position-limiting strip is fixed on an inner side of the side baffle and located above the swivel plate. In this way, the step pin that gets fully into the receiving slot of the swivel plate can be avoided from moving upward to a position above the swivel plate under the vibration of the vibrator bowl.

Preferably, an upper end face at one side end of the side baffle close to the rear baffle is located below an upper end face of the swivel plate. In this way, it is easier to lift the thin segment of the stepped pin that gets into the swivel plate with its thick segment ahead. It is even possible to provide a groove on the discharge track of the vibrator bowl to receive the rear end of the side baffle, so that the upper end face at one end of the side baffle close to the rear baffle is located on a lower side of the swivel plate.

Preferably, a through hole running vertically is formed at an uppermost segment of the discharge track, and an upper end of an output shaft of the drive motor is fixed to the swivel plate after passing through the through hole. In this way, it is easy for installation and protection of the drive motor. In order to ensure the normal transmission of the swivel plate, it is possible to form a larger through hole, and the drive motor is not directly fixed to the vibrator bowl, so as to avoid the drive motor from being affected by the vibrator bowl.

Preferably, the several receiving slots are evenly spaced in a circular shape centered on a center of the swivel plate.

Preferably, the several receiving slots are arranged in a radial shape centered on the center of the swivel plate.

The loading mechanism of the present invention can realize the selection and loading of the stepped pins, so that all stepped pins to be loaded will be loaded with thick segments ahead, to facilitate the subsequent conveying and press-fitting of the stepped pins.

DETAILED DESCRIPTION OF THE INVENTION

The present invention is further described below with reference to accompanying drawings by embodiments.

Figure 1:
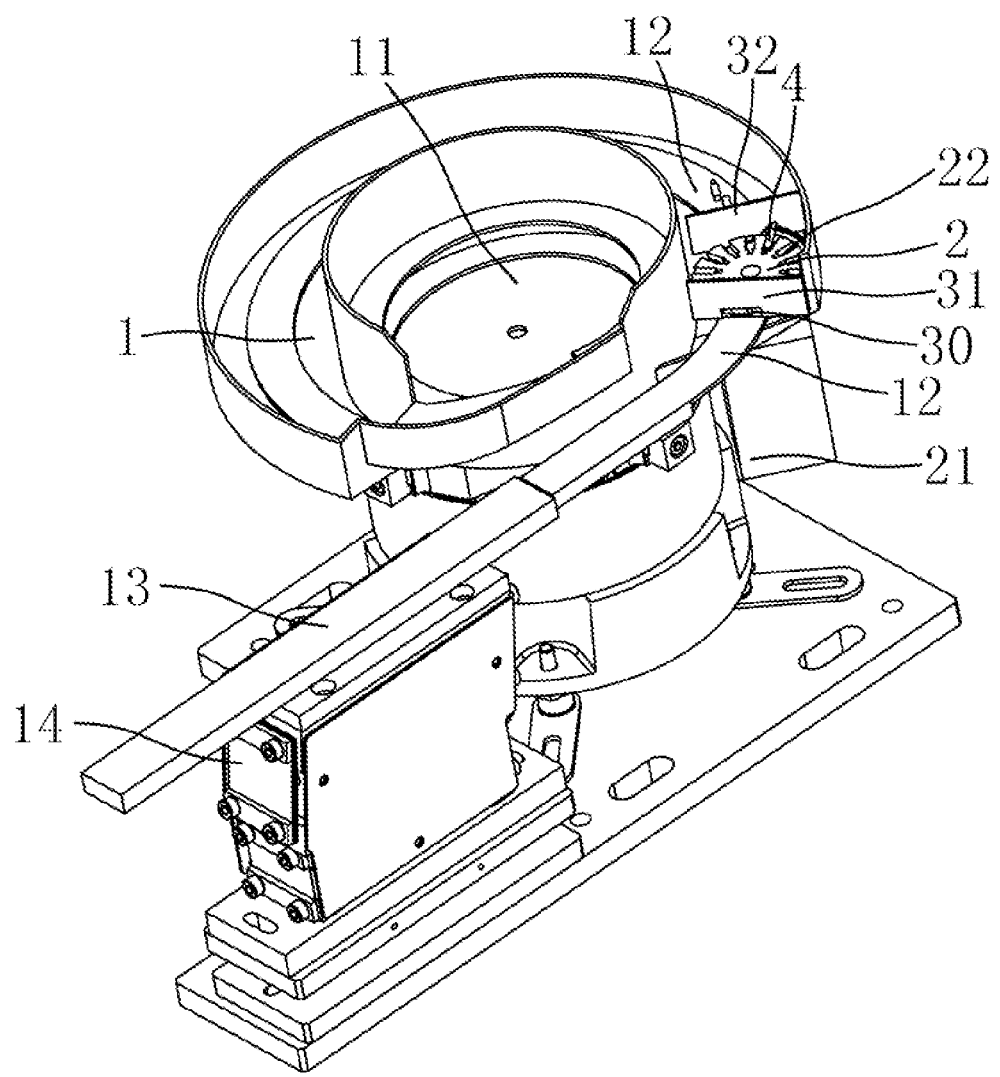
FIG. 1 is a structural diagram according to the present invention.
Figure 2:
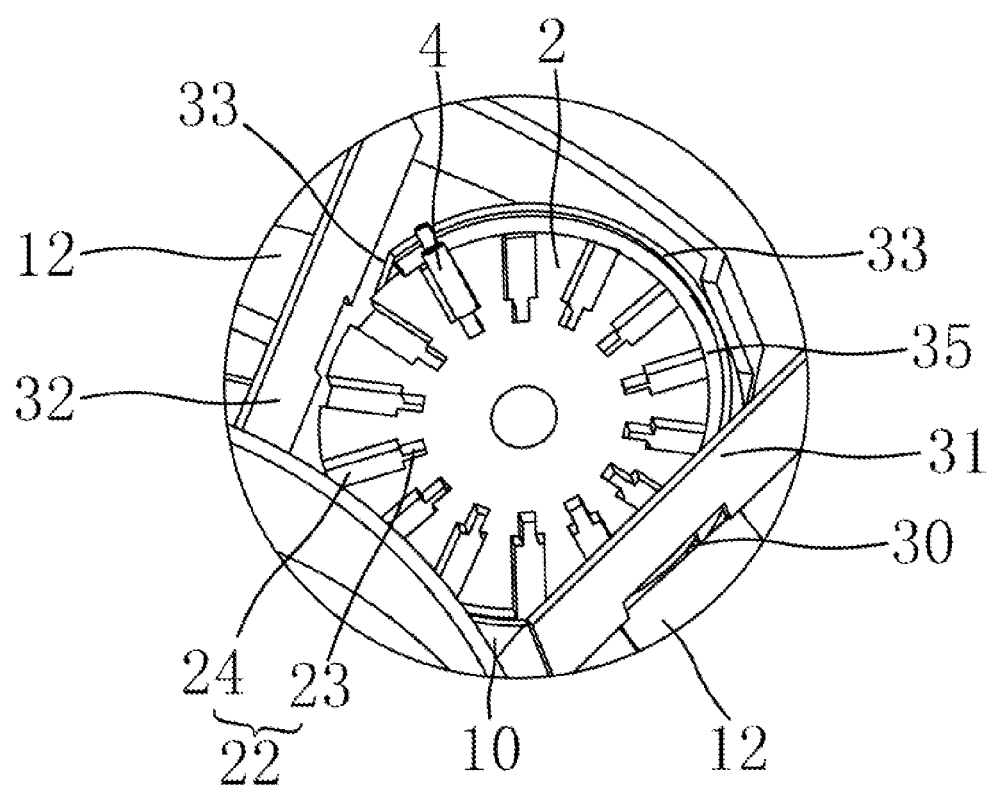
FIG. 2 is an enlarged view of a swivel plate according to the present invention.

As shown in FIGS. 1 and 2, the present invention provides a stepped pin loading mechanism, including a vibrator bowl 1. A spirally rising discharge track 12 is connected to an outer side of a hopper 11 of the vibrator bowl 1, a swivel plate 2, which is linked with a drive motor 21 and revolves on swivel plate's own axis under the action of the drive motor 21, is provided on the discharge track 12, and several receiving slots 22 running vertically through an outer circumferential wall of the swivel plate 2 are provided on the swivel plate 2. The strip-shaped receiving slot 22 consists of an inner segment 23 and an outer segment 24, the width of the outer segment 24 is greater than the maximum diameter of a stepped pin, and the width of the inner segment 23 is greater than the minimum diameter of the stepped pin but less than the maximum diameter of the stepped pin. A front baffle 31 and a rear baffle 32, both of which are provided with a through opening 30 running through the baffle in a longitudinal direction for stepped pins 4 to pass through, are provided on the discharge track 12. An arc-shaped side baffle 33, which is located between the front baffle 31 and the rear baffle 32 to form a semi-enclosed structure, is provided on an outer circumferential side of the swivel plate 2. The semi-enclosed structure is formed with an opening 10 facing toward the hopper 11 to communicate with the hopper 11. A rear end of the side baffle 33 deviates from the through opening of the rear baffle 32, and the height of an upper edge of the side baffle 33 gradually increases from the rear baffle 32 to the front baffle 31 so that an upper edge at a front end of the side baffle 33 is as high as an upper side of the through opening of the front baffle 31, and the front end of the side baffle 33 extends toward the hopper 11 to form a straight segment 34.

The thickness of the swivel plate 2 is less than the maximum diameter of the stepped pin 4 but greater than the maximum radius of the stepped pin 4. The several receiving slots 22 are evenly spaced in a circular shape centered on a center of the swivel plate 2 and arranged in a radial shape centered on the center of the swivel plate 2. A spacing or position-limiting strip 35, which is arc-shaped and located above an outer edge of the swivel plate 2, is fixed on an inner side of the side baffle 33. An upper end face at one side end of the side baffle 33 close to the rear baffle 32 is located below an upper end face of the swivel plate 2.

A through hole running vertically is formed at an uppermost segment of the discharge track 12, and an upper end of an output shaft of the drive motor 21 is fixed to the swivel plate 2 after passing through the through hole. A rectilinear track 13 fitted with a rectilinear vibrator 14 is connected to a front end of the discharge track 12 away from the hopper 11. Both the discharge track 12 and the rectilinear track 13 are provided with a guide groove (not shown) for guiding the stepped pins, and a half width of the guide groove is less than the maximum diameter of the stepped pin. An upper end face of a circular portion of the discharge track 12 on a lower side of the swivel plate 2 is smoothly connected to the bottom of the guide groove.

The loading mechanism of the present invention can realize the selection and loading of the stepped pins, so that all stepped pins to be loaded will be loaded with thick segments ahead, to facilitate the subsequent conveying and press-fitting of the stepped pins.

The invention claimed is:

1. A stepped pin loading mechanism, comprising a vibrator bowl, wherein a spirally rising discharge track is connected to an outer side of a hopper of the vibrator bowl, and a swivel plate, which is linked with a drive motor and revolves on swivel plate's own axis under the action of the drive motor, is provided on the discharge track, and several receiving slots running vertically through an outer circumferential wall of the swivel plate are provided on the swivel plate; the strip-shaped receiving slot consists of an inner segment and an outer segment, and the width of the outer segment is greater than that of the inner segment; a front baffle and a rear baffle, both of which are provided with a through opening running through the baffle in a longitudinal direction for stepped pins to pass through, are provided on the discharge track; an arc-shaped side baffle, which is located between the front baffle and the rear baffle to form a semi-enclosed structure, is provided on an outer circumferential side of the swivel plate; and the semi-enclosed structure is formed with an opening facing toward the hopper to communicate with the hopper; one end of the side baffle deviates from the through opening of the rear baffle, and the height of an upper edge of the side baffle gradually increases from the rear baffle to the front baffle so that an upper edge at the other end of the side baffle is as high as an upper side of the through opening of the front baffle.

2. The stepped pin loading mechanism according to claim 1, wherein the thickness of the swivel plate is less than the maximum diameter of the stepped pin.

3. The stepped pin loading mechanism according to claim 2, wherein the thickness of the swivel plate is greater than the maximum radius of the stepped pin.

4. The stepped pin loading mechanism according to claim 1, wherein the thickness of the swivel plate is greater than the maximum radius of the stepped pin.

5. The stepped pin loading mechanism according to claim 1, wherein a spacing strip is fixed on an inner side of the side baffle and located above the swivel plate.

6. The stepped pin loading mechanism according to claim 1, wherein an upper end face at one side end of the side baffle close to the rear baffle is located below an upper end face of the swivel plate.

7. The stepped pin loading mechanism according to claim 1, wherein a through hole running vertically is formed at an uppermost segment of the discharge track, and an upper end of an output shaft of the drive motor is fixed to the swivel plate after passing through the through hole.

8. The stepped pin loading mechanism according to claim 1, wherein the several receiving slots are evenly spaced in a circular shape centered on a center of the swivel plate.

9. The stepped pin loading mechanism according to claim 1, wherein the several receiving slots are arranged in a radial shape centered on the center of the swivel plate.

\* \* \* \* \*